Jan. 19, 1965  H. F. FLOWERS  3,166,022
SIDE DOOR CONSTRUCTION FOR DUMP VEHICLES
Filed July 2, 1963  4 Sheets-Sheet 1
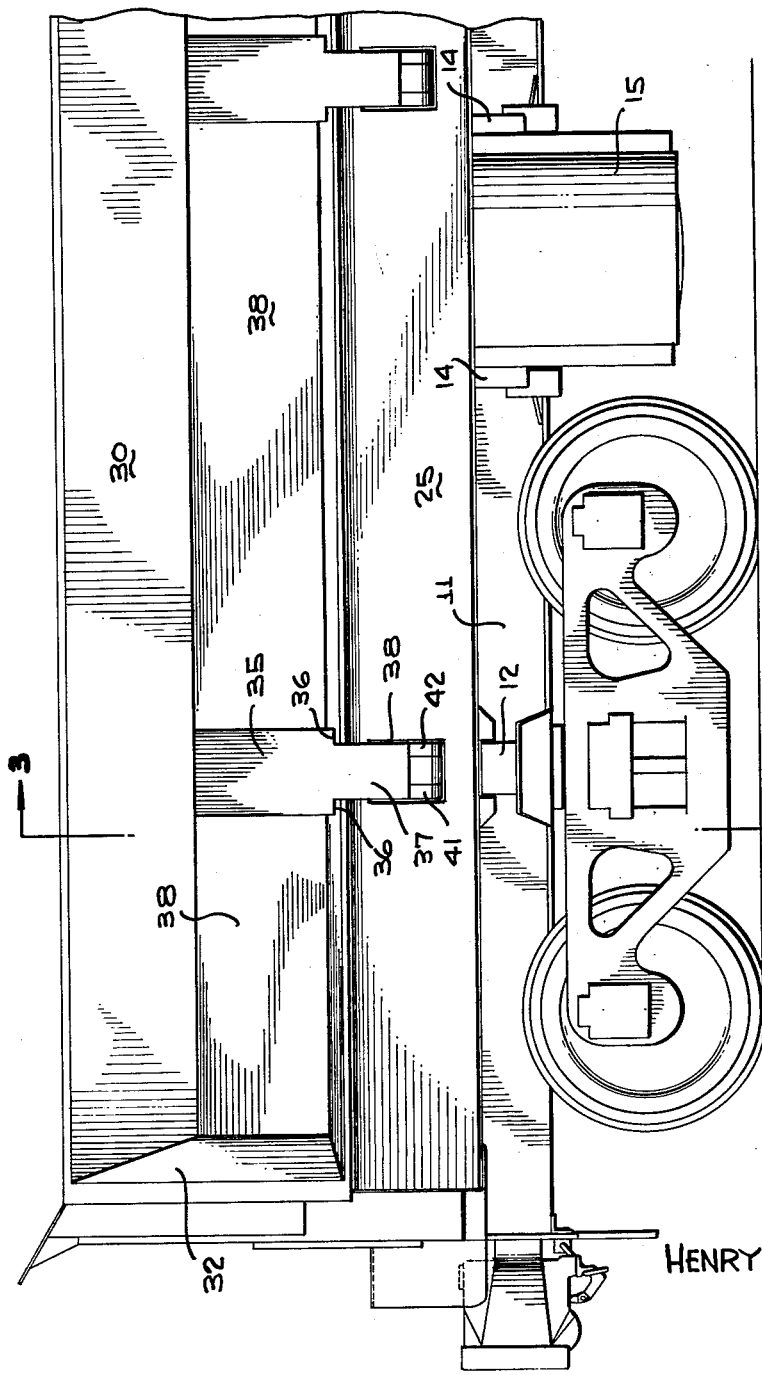
HENRY FORT FLOWERS
INVENTOR
BY *Mason, Porter, Miller & Stewart*
ATTORNEYS Jan. 19, 1965   H. F. FLOWERS   3,166,022
SIDE DOOR CONSTRUCTION FOR DUMP VEHICLES
Filed July 2, 1963   4 Sheets-Sheet 2
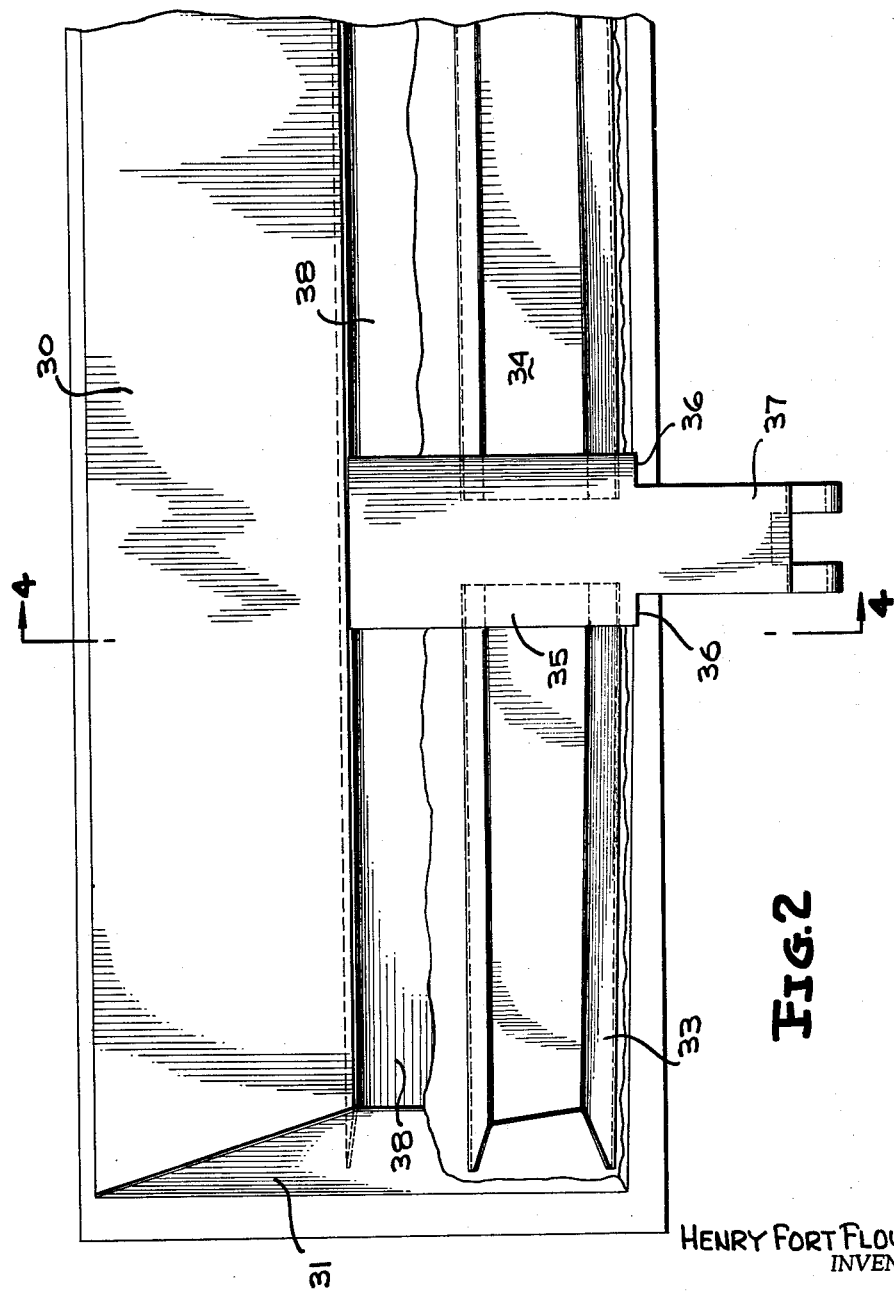
HENRY FORT FLOWERS
INVENTOR
BY *Mason, Porter, Miller & Steward*
ATTORNEYS

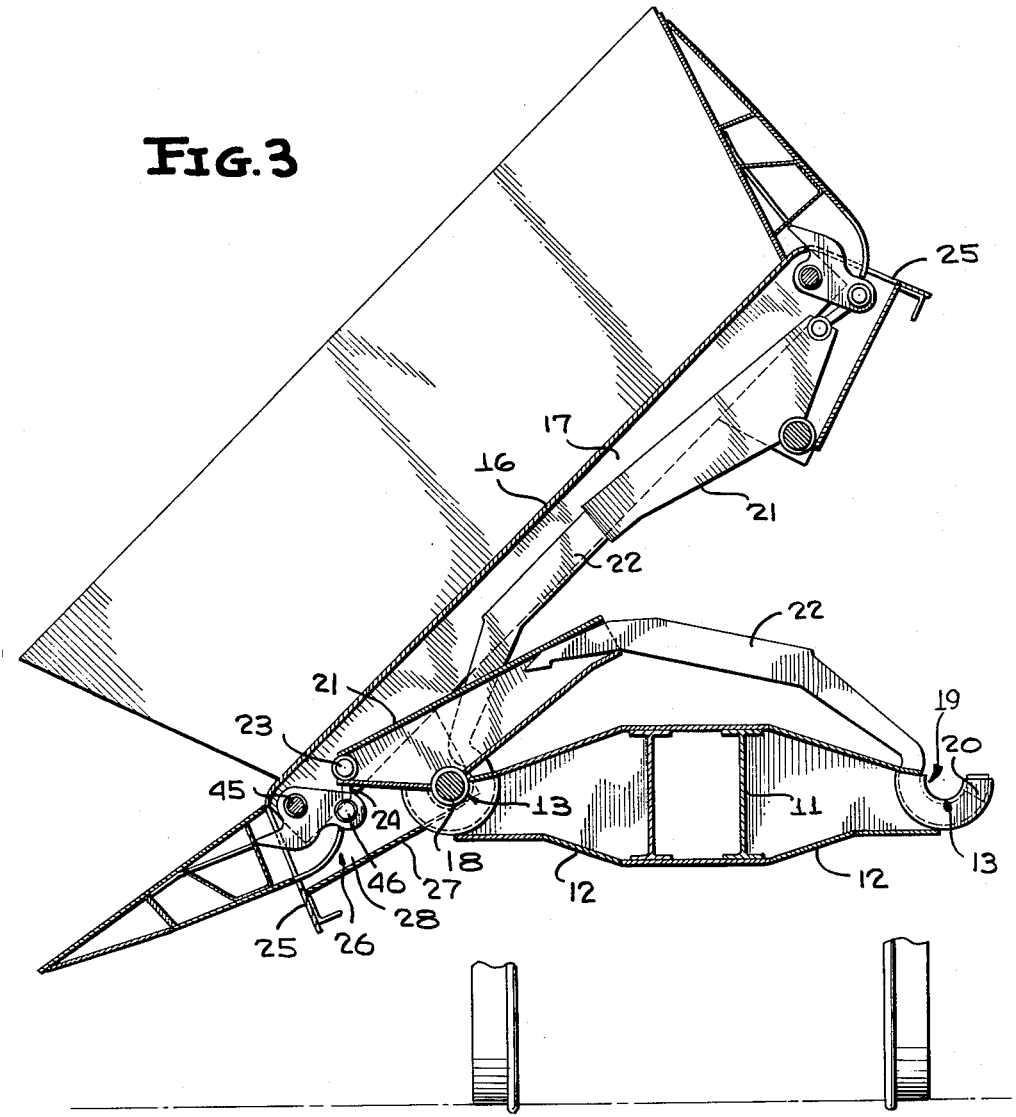

Jan. 19, 1965 H. F. FLOWERS 3,166,022
SIDE DOOR CONSTRUCTION FOR DUMP VEHICLES
Filed July 2, 1963 4 Sheets-Sheet 4
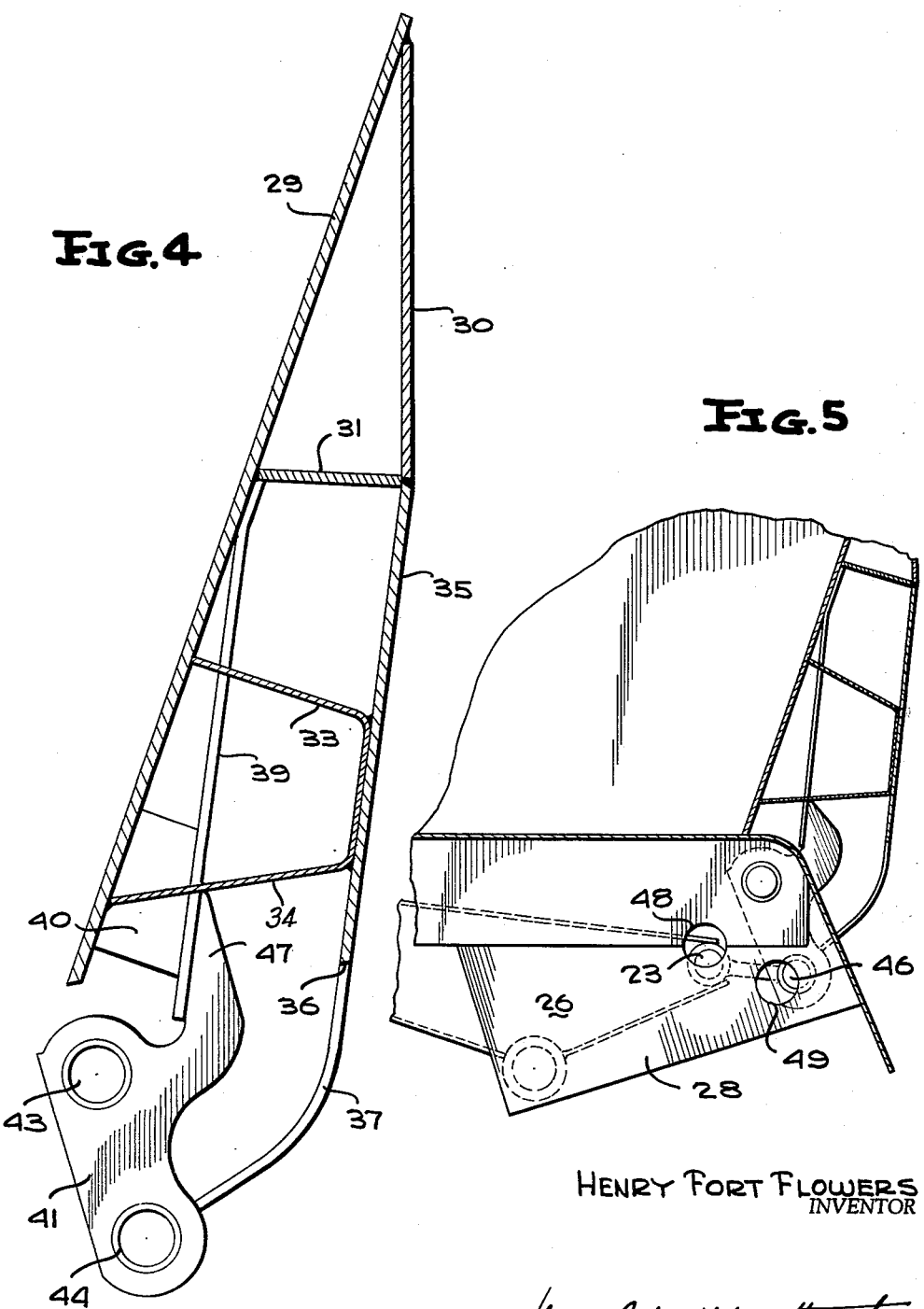
HENRY PORT FLOWERS
INVENTOR
BY *Mason, Porter, Miller & Stewart*
ATTORNEYS United States Patent Office 3,166,022
Patented Jan. 19, 1965

3,166,022
SIDE DOOR CONSTRUCTION FOR DUMP
VEHICLES
Henry Fort Flowers, 3023 Del Monte Drive,
Houston, Tex.
Filed July 2, 1963, Ser. No. 292,227
6 Claims. (Cl. 105—261)

The invention of which the following is a description in detail, relates to a side door construction for dump vehicles, possessing numerous improvements and advantages over the accepted designs now in production.

The present tendency being toward the use of lighter metal sheets and even lighter metals in the fabrication of dump vehicles, is recognized as being most advantageous both in point of construction and also economy. However, the maintenance of satisfactory durability demands definite alterations in design. It has also been found that in ordinary construction, the hinge structures of the down turning side door is frequently interfered with by material dropping between the vehicle floor and the door, thus interfering with the movement of the hinge and the completion of its opening movement.

The present invention comprises a re-design of the downturning side door, so that it is braced at the top, again at the mid-portion over the hinges and also at the bottom edges, where the bulk of material weighs heaviest in the opening movement. Likewise the novel structure includes a positive stop for the door hinges which operate positively and clear of any accidental discharge between the door and the vehicle body.

One of the objects of the invention is to provide the side door with a triangular box section which reinforces the upper portion of the door and insures its rigidity and strength.

A further object of the invention is to brace the mid-portion of the door both horizontally and from below, so that it will have adequate support in the downturning movement.

A still further object of the invention is to reinforce the lower portion of the door by means of lateral braces both extending to the outer panel of the door and to the hinge members.

Among the objects of the invention is to provide easy access to the hinge pins of the linkage for the downturning door.

A still further object of the invention is to provide means on the door for a positive stop against the deflecting apron extended laterally from the car floor.

The preferred form of the invention has been illustrated by way of example in the accompanying drawings in which:

FIGURE 1 is a partial side view of a railway dump vehicle having a dumping side door;

FIGURE 2 is an enlarged fragmentary side elevation of the door partly in section;

FIGURE 3 is a transverse vertical section of the dump vehicle in discharging position taken on the line 3—3 of FIGURE 1;

FIGURE 4 is an enlarged vertical section on the line 4—4 of FIGURE 2 and

FIGURE 5 is a like section of the door hinge.

As shown in the drawings, the railway vehicle forming the dump truck has an underframe with a central box beam or sill 11. This underframe also has bolsters 12, 12, with extend laterally over the trucks. The bolsters support trunnion bearings 13, 13. The underframe also has pairs of journal bearings 14, 14 for fluid (air) lift cylinders 15. Two such cylinders are mounted on each side of the underframe for tilting the vehicle body in one or the opposite lateral direction.

The car body has a floor plate 16 mounted upon cross beams 17, spaced parallel along the length of the floor plate. These floor beams 17 carry pivot pins 18, having bushings 19.

The bushings 19 rest removably in arcuate housings 20. In this manner the dump body can be tilted by the pressure cylinders into the discharge position as shown in FIGURE 3.

A sleeve 21 is carried upon each pivot pin 18 and serves to operate the device for opening the door on the down side of the tilted vehicle body.

The opposite sleeves 21, 21 are controlled by individual control arms 22. Each arm 22 has one end oscillatingly journaled in the housing 20, while the opposite end is slidably carried in the sleeve 21.

In the outer end of each sleeve 21 there is a pivot 23, which reciprocates within that end of the sleeve depending upon the control from the arm 22 and the rocking of the sleeve 21.

This pivot 23 is connected by link 24 to the door operating device.

The structure above described has been disclosed in the Flowers patent March 18, 1958, No. 2,826,999, to which attention is directed for further description.

The floor plate 16 has an apron 25 extending outwardly and downwardly on each side. A box 26 is formed below the floor plate and inside the apron by means of a bottom plate 27 and opposite side plates 28.

The door itself comprises an inner side 29 which is formed of a sheet metal plate of suitable thickness, rigidity and strength when adequately supported and braced.

Part of the bracing for the inner side of the door includes a top panel 30. This is welded or otherwise attached along the upper edge of the door 29. The panel inclines downwardly and away from the inner side wall 29, to which it is fastened by a substantially horizontal brace 31. This brace 31 is welded to both the top panel 30 and the door 29.

An end panel 32 closes the triangle formed by the members 29, 30 and 31.

Spaced below the brace 31 and extending longitudinally of the door, are reinforcing webs 33, 34. These are welded to the lower portion of the inner side of the drop side door 29. Being of general U-shape, these form a box girder for reinforcing the door 29 at spaced points.

A brace plate 35 is welded to the top panel 30 and flat against the outer portion of the spaced webs 33, 34. The brace plates 35 form covers for the areas occupied by the hinge members. The brace plates 35 each have a lower inwardly curved section 37. These sections are narrower than the brace 35, and the latter thus forms shoulders 36, 36.

Outer plates 38, 38 bridge the opening between the upper panel 30 and the webs 33, 34.

Beneath each brace plate 35 is a parallel brace plate 39. This plate 39 is welded or otherwise attached to the outer surface of the drop side door 29 immediately below the transverse brace 31. At its lower end, the plate 39 is fastened to the door 29 by means of parallel struts 40 (FIGURE 4).

The brace 39 carries at its lower end a pair of spaced hinge brackets 41, 42. These brackets carry lined bearings 43, 44, longitudinally spaced. The bearings of the two brackets are in alignment.

On FIGURE 1, the brackets 41, 42 are shown to be spaced apart the width of the narrowed portion 37 of the brace plate 35.

The apron 25 of the floor plate is cut away opposite the brackets 41, 42 to permit them to move in and out carrying with them the curved portion 37 of the brace plate 35.

The notched shoulders 36, 36 come to rest on the face of the apron 25 and thus limit the downward movement of the drop side door 29.

A hinge pin 45 (FIGURE 3) runs transversely through the bearings 43 and is mounted on the opposite side walls 28 of the box 26.

A second hinge pin 46 passes through the aligned bearing 44. The hinge pin 46 in its intermediate portion between the bearings 44 carries a link 24. This link is connected to the pivot 23. As a consequence the movement of the pivot 23 in the sleeve 21 operates the downward movement of the drop side door 29 through the link 24.

The upper end of each bracket 41, 42 is formed as an arm or pad 47. This is firmly attached to the outer surface of the brace plate 39.

It will be seen from FIGURE 5 that the side plates 28 of the box 26 have two holes 48 and 49.

When the door is opened partially and held in any convenient position by means of a bolt, link or chain, or supported by a prop, the pivot 23 is brought in line with the opening 48 and at the same time the hinge pin 46 is brought in line with the opening 49. This permits ready removal of the pivot 23 and hinge pin 46, thus facilitating the dismantling of the door and its separation from the door-operating mechanism.

By the use of the design above described, provision is made for reinforcing the side door of the vehicle by separate box sections, and hinge plates reinforcing these box sections as well as providing positive stops limiting the opening movement of the door in the discharge position. Also, the hinge members are applied to the door through an intermediate reinforcing plate. Finally, the structure includes convenient access for installation and removal of the hinge pins.

The invention has been described by way of example. It may, however, be embodied in various structures, proportions and materials, within the scope of the appended claims.

What I claim is:

1. In a dump vehicle having an underframe, a body tiltably journaled on the underframe, said body having a bottom and ends, an apertured apron extending downwardly from each side of the bottom, side doors hinged to the body, means on the underframe for tilting each door, each door comprising an inner side, a top panel attached thereto, a brace connecting the lower edge of the panel to the side, a longitudinal box girder on the lower portion of the side, and outer brace plates attached to the panel and to the midportion of the girder and having portions extending through the apertures of the apron.

2. In a dump vehicle having an underframe, a body tiltably journaled on the underframe, said body having a bottom and ends, an apertured apron extending downwardly from each side of the bottom, side doors hinged to the body, means on the underframe for tilting each door, each door comprising an inner side, a top panel attached thereto, a brace connecting the lower edge of the panel to the side, a longitudinal box girder on the lower portion of the side, and outer brace plates attached to the panel and to the midportion of the girder and having narrowed portions extending through the apertures of the apron and having adjacent shoulders resting on the apron on each side of the aperture when the door is fully opened.

3. In a dump vehicle having an underframe, a body tiltably journaled on the underframe, said body having a bottom and ends, an apertured apron extending downwardly from each side of the bottom, side doors hinged to the body, means on the underframe for tilting each door, each door comprising an inner side, a top panel attached thereto, a brace connecting the lower edge of the panel to the side, a longitudinal box girder on the lower portion of the side, and outer brace plates attached to the panel and to the midportion of the girder and having arcuate narrowed portions extending through the apertures of the apron and having adjacent shoulders resting on the apron on each side of the aperture when the door is fully opened.

4. In a dump vehicle having an underframe, a body tiltably journaled on the underframe, said body having a bottom and ends, an apertured apron extending downwardly from each side of the bottom, side doors hinged to the body, means on the underframe for tilting each door, each door comprising an inner side, a top panel attached thereto, a brace connecting the lower edge of the panel to the side, a longitudinal box girder on the lower portion of the side, outer brace plates attached to the panel and to the midportion of the girder and having portions extending through the apertures of the apron, an inner brace plate parallel to the outer brace plate and attached at its upper end to the inner door side, parallel struts between the inner door side and the inner brace plate, a pair of spaced brackets attached to the inner brace plate, and separate hinge connections between the brackets and the vehicle body and between the brackets and the door tilting means.

5. In a dump vehicle having an underframe, a body tiltably journaled on the underframe, said body having a bottom and ends, an apertured apron extending downwardly from the bottom, a side plate on each side of each aperture connecting the bottom with the apron, a side door, spaced hinge brackets on the side door extending through the apertures of the apron, a hinge pin on the body and supporting the brackets, a pivot pin on the brackets, a link carried by the pivot pin, and a journal on the free end of the link, said side plates being apertured to register with both said pivot pin and journal when the door is partially tilted.

6. A down-turning side door for a dump vehicle comprising an inner side, a top panel attached thereto, a brace connecting the lower edge of the panel to the side, a longitudinal box girder on the lower portion of the side, outer brace plates attached to the panel and to the girder, an inner brace plate parallel to the outer brace plate and attached at its upper end to the inner door side, parallel struts between the inner door side and the inner brace plate, and a pair of spaced brackets attached to the inner brace plate, said brackets having spaced pivot journal bearings.

References Cited by the Examiner
UNITED STATES PATENTS

| | | | |
|---|---|---|---|
| 2,200,271 | 5/40 | Flowers | 105—276 |
| 2,745,359 | 5/56 | Lunde | 105—272 |
| 2,826,999 | 3/58 | Flowers | 105—277 |

EUGENE G. BOTZ, *Primary Examiner.*

LEO QUACKENBUSH, *Examiner.*